United States Patent
Bhattacharyya et al.

[11] Patent Number: 5,891,379
[45] Date of Patent: Apr. 6, 1999

[54] ROLL FORMING OF THERMOPLASTICS

[75] Inventors: Debes Bhattacharyya; Simon John Mander, both of Auckland, New Zealand

[73] Assignee: Auckland Uniservices Limited, Auckland, New Zealand

[21] Appl. No.: 875,917
[22] PCT Filed: Feb. 8, 1996
[86] PCT No.: PCT/NZ96/00007
  § 371 Date: Nov. 26, 1997
  § 102(e) Date: Nov. 26, 1997
[87] PCT Pub. No.: WO96/24479
  PCT Pub. Date: Aug. 15, 1996

[30] Foreign Application Priority Data

Feb. 8, 1995 [NZ] New Zealand ............... 270469

[51] Int. Cl.$^6$ .................. B29C 55/06; B29C 55/18
[52] U.S. Cl. ............. 264/280; 264/288.4; 425/143; 425/335; 425/363; 425/377; 425/378.1; 425/379.1; 425/404; 425/445
[58] Field of Search ................ 264/280, 288.4; 425/143, 335, 363, 377, 378.1, 379.1, 404, 445

[56] References Cited

U.S. PATENT DOCUMENTS 3,478,138  11/1969  Friesner .
5,352,110  10/1994  Hayakawa et al. ............ 264/280 X

FOREIGN PATENT DOCUMENTS 1 371 329  10/1974  United Kingdom .
92/13706  8/1992  WIPO .

OTHER PUBLICATIONS

*Patent Abstracts of Japan,* M1366, p. 20, P-4-275127A, (Takiron Co. Ltd.) Sep. 30, 1992.

*Modern Plastics Encyclopedia,* 92 McGraw Hill Inc., Oct. 1991, p. 284.

*Primary Examiner*—Leo B. Tentoni

[57] ABSTRACT

A method and apparatus for forming fiber-reinforced thermoplastic materials which include the steps of arranging at least two sets of roll-forming dies in an operative relationship, introducing a portion of a fiber-reinforced thermoplastic element to said dies for predetermined deformation, heating the element to a temperature above the melting temperature of the thermoplastics in the element and then allowing the element to cool below the melting temperature, but not less than the recrystallization temperature of the thermoplastic, and passing the element in the state through the at least two sets of dies wherein the distance between each consecutive set of dies exceeds the deformation length created by the at least two sets of dies.

5 Claims, 1 Drawing Sheet

ROLL FORMING OF THERMOPLASTICS

BACKGROUND TO THE INVENTION

The present invention relates to the improvements and developments in roll forming, particularly in the roll forming of fibre reinforced thermoplastic (FRTP) or so-called, "composite" sheet materials.

Throughout-this specification, reference is made to the terms "pitch" and "deformation length" in relation to roll forming techniques and to "melting temperature" and "recrystallisation temperature" in respect of thermoplastics. It is understood that the terms are defined as follows:

"Pitch" is the centre distance between two consecutive roll stands where a series of roll forming stations are provided in tandem.

"Deformation length" is the distance to which portions of the element being formed are deformed out of register from their original position prior to entering the current roll forming station.

"Melting temperature" is the temperature range (which could be as large as 30 degrees Celsius) at which the plastic undergoes a phase change from a solid to liquid, upon heating.

"Recrystallisation temperature" is the temperature at which the semi-crystalline or crystalline matrix begins to form crystals upon cooling from the fully molten amorphous state. The onset of re-crystalisation from the fully molten state takes place over a temperature "window-range", which is dependant on the rate of cooling and the final achievable degree of crystallinity of the polymer matrix.

The benefits arising from the ability to form thermoplastic materials in their molten state (thermoforming) are well recognised. They include the ability to form sheet materials (including FRTP sheet) to relatively fine tolerances and quality standards as a raw material and then use these products to create geometric forms which are specifically applicable to the intended purpose.

It is expected that efficient structures, particularly those formed from composite or FRTP materials, can be created which will have optimal strength to weight ratios and other desirable qualities and that these structures are able to be produced more adequately in a more convenient and controllable manner.

Notwithstanding the benefits which arise from the use of FRTP or composite materials in producing geometric forms significant difficulties have been encountered in achieving the objective of forming such materials in such a way which does not lead to a degradation in the physical structure (and the associated undue weakening of the material) and thus the formed element.

In the past, attempts have been made to utilize the roll forming technique in the forming FRTP composite sheets. These attempts have centred on two main themes both of which have proved unsatisfactory.

One method involves enclosing the whole roll forming equipment in an oven where the temperature is controlled so that it remains above the melting temperature of the FRTP composite strip. In this manner, the molten strip is then pulled through the consecutive roll forming stations, as opposed to the accepted practice of using the rotation of the roll forming dies to progressively drive the material through the forming process. The necessity of the molten strip to be pulled through the roll forming equipment places severe limitations on the speed at which the material can be formed.

Difficulties are experienced in passing the floppy FRTP material through the roll forming equipment and in holding the formed element in its desired shape while the material cools to sufficient temperature such that it remains stable.

The second method involves localised heating of the FRTP material strips in the regions where the deformation is expected to occur during the roll forming process. Once the relevant regions have been heated to above the molten temperature of the FRTP material, the strip is then passed through the roll forming equipment. Heating elements are positioned along the path the FRTP strip takes while being formed to maintain the FRTP material above its melting temperature.

This method results in uncontrolled delamination of the FRTP material as the deformation occurs as well as fracture of the reinforcing fibers in the deformation area due to the requirement that the FRTP material needs to flow generally rather than locally during a forming process. This can only be achieved by maintaining the whole FRTP strip in a molten state during the forming process.

Both of the described methods result in undesirable migration of the fibers within the deformation region, the former method due to the excessive tensions required to pull the FRTP strip through the roll forming equipment in conjunction with the high forming temperatures used and the later due to the high localized strains induced in the reinforcing fibers in the deformation region.

OBJECT OF THE INVENTION

It is an object of this invention to provide a method of roll forming elements which at least to some extent addresses the problems previously described or at least provides the public with a useful choice.

Other objects of this invention will become apparent from the following description.

SUMMARY OF THE INVENTION

According to one aspect of this invention there is provided a method of roll forming fiber reinforced thermoplastic (FRTP) materials, including the steps of;

arranging at least a pair of roll forming dies e.g., at least two sets of roll-forming dies in an operative relationship;

introducing a portion of fiber reinforced thermoplastic element to said dies for predetermined deformation;

heating the said element to a temperature above a melting temperature of thermoplastics in said element and then allowing the said element to cool below the melting temperature, but not less than a recrystallisation temperature of said thermoplastic; and passing said element in such state through said dies, wherein the distance between each consecutive set of dies exceeds the deformation length created by said sets of dies.

According to a further aspect there is provided an apparatus for the roll forming of fiber reinforced thermoplastic (FRTP) materials comprising;

at least two sets of dies for the forming of a fiber reinforced thermoplastic element;

heating means to heat said element prior to passage of said element to said forming station; and control means to control said heating and passage of said element through said apparatus such that said element is heated by said heating means to a temperature above a melting temperature of thermoplastics in said element and allowed to cool below the melting temperature but not less than a recrystallisation temperature of said thermoplastics and then passed through said dies to form said element, wherein the distance between each consecutive set of dies exceeds the deformation length created by said at least two sets of dies.

BRIEF DESCRIPTION OF THE DRAWINGS

Preferred embodiments of the invention will now be described with reference to the following drawings in which.

DETAILED DESCRIPTION OF PREFERRED EMBODIMENTS

The one form of the invention described is in relation to roll forming of a typical FRTP composite material sheet, such as a laminate of thermoplastic resin material in a molten, supercooled or plastic state to be semi-rigid or rigid with orientated fibers therein, such as that known in the trade as Kevlar TM, Carbon, E glass, S Glass and resins which are applicable to the roll forming type such as Polypropylene (PP), Poly(etheretherketone) (PEEK), Polyetherketone (PEK), Polyetherketone ketone (PEKK), Polyurethane (PU), Poly(ethersulfone) (PES), Homopolycondensates (for example, PA6 and PA66). Whilst the abovementioned materials are identified by way of example, the invention is no way limited to these materials.

In the preferred embodiment of the invention, the raw material for roll forming is arranged as a sheet of the required length for the intended final element, or as a coil of material to be cut to the desired length for the intended final element after roll forming initially laminated as a strip of the required width cut from a larger sheet (subject to the fiber orientation being arranged to suit the final formed usage).

It will be appreciated that thermoplastic resins utilized in forming the laminate become deformable at temperatures in excess of their melting temperature and yet whilst deformable, substantially maintain their overall external form yet are bendable, formable by, for example roll forming dies.

Figure 1:
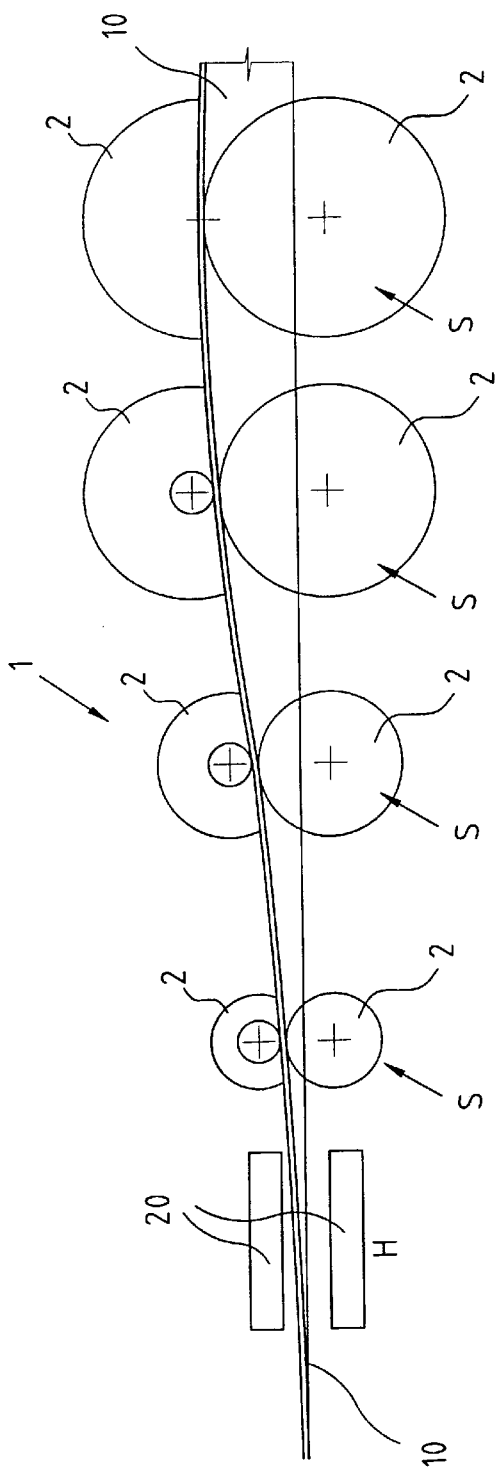
FIG. 1 Shows a cross sectional elevation through an apparatus in accordance with a preferred embodiment of the invention.
Figure 2:
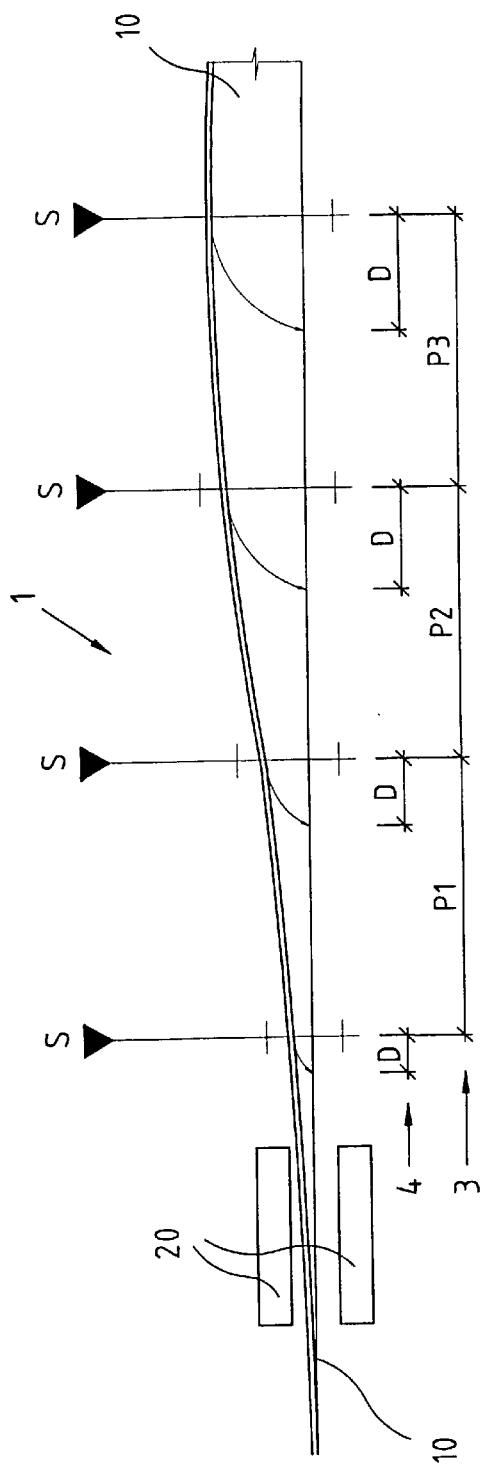
FIG. 2 Shows a diagrammatic of the geometry of the apparatus of FIG. 1.

Referring to the drawings in the preferred form, preferably a roll forming line 1 is arranged with roll forming dies 2 arranged in stations S according to a pathway and at a pitch 3 as shown in FIG. 2 P1, P2, P3, which is predetermined to be in excess of deformation length 4 at each roll station S.

In the preferred form, each roll forming station S is provided with the roll forming dies 2 to arrange to contact with the other on either side of an element 10 to be roll formed so that element 10 can be progressively roll formed from a flat sheet to the U shaped channel section shown by way of example.

In the preferred form of the invention, preferably directed heating means 20 are provided upstream of the roll forming stations S to cause the element 10 to reach a molten (viscous) state in a controlled manner prior to entering roll forming dies 2. The degree of viscosity of the element 10 is to be controlled to an extent such that the fibers within the element 10 are able to move and deform sufficiently during the deformation process whilst the element 10 passes through the series of roll stations S.

In the embodiment of the invention described, preferably a raw ribbon of sheet is provided of a thickness to width ratio of approximately 1 to 50 (dependent on the intended geometry of the formed part) and is preferably formed of a composite of 65% resin and 35% fibers by volume fraction (dependent upon the desired composite strength), the fibers being arranged according to the desired composite strength but preferably both longitudinal and oppositely diagonal orientations.

Preferably the heating of the element 10 is confined to the immediate vicinity of the entry of the element 10 into the stations S and is over a sufficient area of element 10 to achieve a molten condition within the supporting resin for the fibers, such that the fibers and resin can be deformed prior to entering and within the dies 2 without causing fracture and delamination of the element 10.

In the example shown the full width of the element 10 is heated above the melting temperature of the thermoplastic resin to achieve a molten state within the resin of the element 10, prior to roll forming in dies 2. The element 10 is allowed to cool to a temperature below the melting temperature and above the recrystallisation temperature of the thermoplastic of the element 10, and is passed through the dies 2 whilst at a temperature within that band.

If needed, further or secondary heating from heating elements 20 can be applied to the element as it passes between stations S to ensure that the element does not reach a temperature below the thermoplastic resin crystallisation temperature.

Further, preferably some cooling arrangement such as a water bath, cooling gas stream and the like can be positioned on the output side of the final station S to actively remove heat from the element 10 when formed and force the thermoplastic resin to recrystallise and hence retain the desired deformed shape of element 10.

It has been found that by roll forming FRTP composites in this manner, a reduction in the buckling and deformation of the element can be achieved and further, the method resists delamination and fracturing of the fibers in the vicinity of the deformation region.

As a result of the placing of the roll forming stations at a pitch greater than the deformation length and preheating the element 10 above the melting temperature of the thermoplastic resin and then proceeding to deform the element at a temperature above the thermoplastic resin recrystallisation temperature, the fibers are able to reorientate and move within the carrier medium of plastic resin material in element 10, to an extent that undesirable characteristics within the roll formed element 10 when formed are eliminated or reduced.

Thus, by this invention, there is provided a method of conveniently roll forming fiber reinforced thermoplastic materials.

What is claimed is:

1. A method roll forming fiber-reinforced thermoplastic (FRTP) materials, including the steps of:

arranging at least two sets of roll forming dies in an operative relationship;

introducing a portion of a fiber-reinforced thermoplastic element to said dies for predetermined deformation;

heating the said element to a temperature above the melting temperature of the thermoplastics in said element and then allowing the said element to cool below the melting temperature, but not less than the recrystallization temperature of said thermoplastic; and passing said element in such state through said at least two sets of dies wherein the distance between each consecutive set of dies exceeds the deformation length created by said at least two sets of dies.

2. The method of roll forming fiber reinforced thermoplastic (FRTP) materials as claimed in claim 1 wherein the method includes the step of applying heat to said element to maintain said element at a temperature above said recrystallization temperature while said element is passed through said dies.

3. The method of roll forming fiber-reinforced thermoplastic (FRTP) materials as claimed in claim 1 wherein said method includes the step of cooling said element after passage of the element through said dies to a temperature below said recrystallization temperature.

4. An apparatus for the roll forming of fiber-reinforced thermoplastic (FRTP) materials comprising:

at least two sets of dies for the forming of a fiber-reinforced thermoplastic element;

heating means to heat said element prior to passage of said element to said at least two sets of dies; and control means to control said heating and passage of said element through said apparatus such that said element is heated by said heating means to a temperature above the melting temperature of thermoplastics in said element and allowed to cool below the melting temperature but not less than the recrystallization temperature of said thermoplastics and then passed through said at least two sets of dies to form said element, wherein the distance between each consecutive set of dies exceeds a deformation length created by said at least two sets of dies.

5. The apparatus for roll forming fiber-reinforced thermoplastic (FRTP) materials as claimed in claim 4 wherein said apparatus further includes cooling means to cool said element after passage through said dies.

* * * * *